Oct. 1, 1946.                H. S. BLOCH                2,408,548
          ISOMERIZATION OF NORMALLY LIQUID HYDROCARBONS
                       Filed Dec. 10, 1942
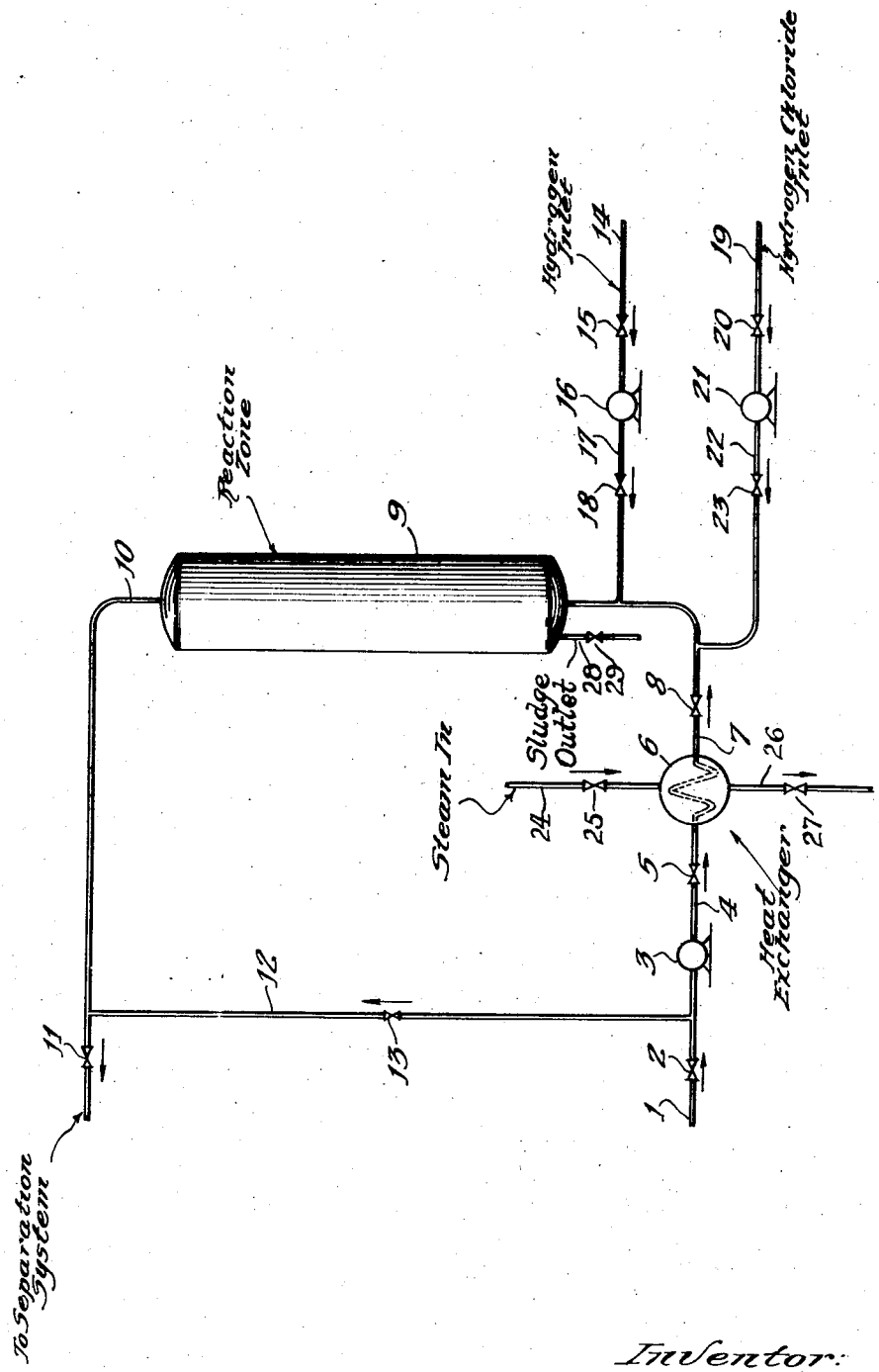
Inventor:
Herman S. Bloch,
By: Lee J. Gary
        Attorney Patented Oct. 1, 1946

2,408,548

UNITED STATES PATENT OFFICE 2,408,548

ISOMERIZATION OF NORMALLY LIQUID HYDROCARBONS

Herman S. Bloch, Riverside, Ill., assignor to Universal Oil Products Company, Chicago, Ill., a corporation of Delaware Application December 10, 1942, Serial No. 468,496

6 Claims. (Cl. 260—683.5)

The present invention relates to the catalytic isomerization of saturated hydrocarbons in the substantially liquid phase. More specifically, it deals with a novel method wherein the catalyst is utilized to its maximum efficiency under optimum conditions of operation.

The present invention is applicable not only to the isomerization of individual saturated hydrocarbons such as butane, pentane, hexane, heptane, cyclohexane, etc., but also to hydrocarbon mixtures containing these compounds in substantial percentages such as straight run gasolines and other fractions. It is particularly adaptable to the isomerization of low octane number gasoline fractions containing the usual amount of paraffinic and naphthenic hydrocarbons. The resulting product from the isomerization of these fractions has a high antiknock value and an exceptionally high lead susceptibility.

Principally, the present invention comprises contacting a granular bed of a metallic halide isomerizing catalyst with a mixture of saturated hydrocarbons and hydrogen halide in a cyclic flow operation under specific operating conditions, withdrawing a portion of the isomerized product and commingling the remaining portion of the product from the reacting zone with the fresh feed being introduced into the system, the amount of fresh feed being substantially equivalent to the amount of isomerized product withdrawn.

Isomerizing catalysts which may be effectively utilized in the present invention will comprise metallic halides of the Friedel-Crafts type which possess some isomerizing activity and which preferably possess a low solubility in the hydrocarbons under the particular conditions of operation. If the solubility of the metal halides is appreciable, obvious changes may be made in the operating procedure whereby the hydrocarbon products from the system may be separated from dissolved salts and the latter, in solution with the recycle hydrocarbons, commingled with the fresh charge.

The operating variables in this isomerization process include the temperature, space velocity (liquid volumes of charge per volume of catalyst bed per hour), linear velocity, hydrogen halide concentration, hydrogen concentration, and the residence time of the hydrocarbons in the catalytic zone.

I have found that, with the other conditions of operation held substantially constant, the degree of isomerization will be influenced to a considerable extent by the linear velocity of the reactants through the bed of granular catalyst (or by the mass velocity, which differs from the linear velocity by a factor of the density of the charge).

Although the reason for this particular effect is not clearly understood, it is probable that at increased linear velocities, a scouring action is obtained which constantly cleans the catalyst surfaces and permits the reactants to continually contact active catalyst particles.

One of the advantages of the present invention is its increased flexibility over the methods of operation previously disclosed in that the linear velocity can be varied over wide ranges while maintaining the actual charge rate of fresh feed to the reaction zone substantially constant. For example, in a once-through operation for a given reactor size the linear velocity and residence time of the hydrocarbons in the reaction zone are directly proportional to the space velocity of the fresh feed being charged. However, in my improved operation, the linear velocity of the hydrocarbon through the same size reaction zone is a function of both the space velocity of the fresh feed and the combined feed ratio which is dependent upon the recycle rate being used. It is possible to obtain various linear velocities through the reaction zone without changing the residence time or space velocity of the fresh feed. It is therefore obvious that in a once-through operation, if the optimum residence time does not coincide with the optimum linear velocity, it is necessary to operate at some intermediate value of residence time and linear velocity which will give the best average results. However, when operating in accordance with the present invention, the optimum residence time may be maintained and the linear velocity independently varied by varying the combined feed ratio, thereby obtaining the most efficient operation possible.

The following formulae are introduced to further explain the advantages of the present process over the well-known operations. These formulae are applicable to a liquid phase isomerization process and will give a comparison of the flexibilities of a once-through operation and the cyclic operation of the present invention in respect to a given reactor size.

The first formula which applies is (1) $\quad L = f_1(S, C)$ where $L$ = linear velocity
$S$ = space velocity of fresh feed
$C$ = combined feed ratio, defined as the amount of recycle plus the amount of fresh feed divided by the amount of fresh feed per unit time.

$f_1$ = a function involving the reciprocal of the cross-section of the catalytic reactor $$(2) \qquad T = f_2 \frac{1}{S}$$

where

T = average residence time in the reaction zone, defined as the volume of free space in the reaction zone divided by the volume of fresh feed per unit time.

$f_2$ = a function involving the percentage of free space in the catalyst bed.

Substituting Formula 2 in Formula 1 the following is obtained:

$$(3) \qquad L = f_3\left(\frac{1}{T}C\right)$$

In a once-through operation the combined feed ratio is equal to unity and Formula 1 is then equal to $$(4) \qquad L = f_1(S)$$

or Formula 3 is equal to $$(5) \qquad L = f_3\left(\frac{1}{T}\right)$$

It is evident from the above formulae that it is impossible in a once-through operation with a given reaction vessel to independently vary the space velocity and the linear velocity.

In operating in accordance with the cyclic flow method herein disclosed it can readily be seen that the linear velocity can be varied over wide ranges while holding the space velocity of the fresh feed constant by varying the combined feed ratio. This permits conducting the operation at the optimum space velocity of fresh feed and the optimum linear velocity.

I have found that the specific conditions of temperature, hydrogen chloride concentration, space velocity, residence time and linear velocity to be used with a given charging stock in conjunction with the cyclic flow operation fall within well defined ranges depending primarily upon the isomerizing catalyst being used. It is desirable that the temperature of the operation be sufficiently low so that the solubility of the catalyst in the hydrocarbon is practically negligible, since the operation is greatly simplified thereby. When using an aluminum chloride isomerizing catalyst, the isomerization temperature is maintained below about 150° F. The minimum space velocity which may be utilized is about 0.4 volume of combined feed per volume of catalyst bed per hour. It is difficult to ascertain the maximum permissible space velocity, since these space velocities will be governed somewhat by the type of equipment being used. However, I have found that space velocities in excess of 50 do not give any appreciable improvement in results. The residence time will be dependent primarily upon the space velocity of the fresh feed but will always be below 15 hours. The linear velocity will be dependent upon the size of equipment, combined feed ratio, etc., but will always be in excess of about 20 centimeters per hour. I have found that improved results are obtained with increases in linear velocities in the stream line flow region and it is to be expected that further improvements will be obtained in the turbulent flow regions.

In one specific embodiment the present invention relates to a process for the isomerization of saturated hydrocarbons which comprises contacting said hydrocarbons in the presence of hydrogen chloride with an aluminum chloride isomerizing catalyst disposed within the reaction zone, withdrawing and recovering a portion of the emergent products from said reaction zone, and commingling the remaining hydrocarbons having substantially the same composition as the withdrawn portion with the hydrocarbons being charged to the reaction zone.

The invention will be more fully explained by a description of an operation in connection with the accompanying diagrammatic drawing which illustrates in conventional side elevation one type of apparatus in which the objects of the invention may be accomplished.

Referring to the drawing a saturated hydrocarbon charge, for example, a gasoline fraction of about 210° F. end-point containing saturated $C_5$, $C_6$ and $C_7$ hydrocarbons is introduced through line 1 containing valve 2 and is commingled with recycled hydrocarbons obtained as hereinafter set forth, and the mixture transferred by pump 3 through line 4 containing valve 5 into heat exchanger 6. During the passage of the hydrocarbons through heat exchanger 6 they are raised to a temperature sufficiently high to compensate for heat losses when transferred through line 7 containing valve 8, and to maintain the desired temperature in reactor 9. Steam is introduced into exchanger 6 through line 24 containing valve 25 and the condensate is withdrawn through line 26 containing valve 27.

The necessary hydrogen chloride is introduced through line 19 containing valve 20 into compressor 21 which discharges through line 22 containing valve 23 into line 7. The amount of hydrogen chloride added to the hydrocarbon charge is dependent primarily upon the actual residence time of the hydrocarbons within the reaction zone. I have found that the maximum hydrogen chloride as weight per cent of the hydrocarbon charge varies with the residence time of the hydrocarbon in the reaction zone in accordance with the following empirical formula:

$$\text{Hydrogen chloride concentration} = \frac{240}{\text{residence time in hours}} + 10$$

As is evident from the formula, the maximum hydrogen chloride concentration decreases with increases in residence time.

Although not essential for the effective conduction of the reaction, I have found that the addition of hydrogen has a beneficial effect in decreasing the amount of side reactions and increasing the octane number of the isomerized product. The amount of hydrogen introduced into the reaction zone depends somewhat on the catalyst and the temperature maintained in said reaction zone. For example, when aluminum chloride is used at temperatures of about 85° F., the beneficial hydrogen pressure in the system lies within the approximate range of 25 to 125 pounds per square inch. At higher and lower temperatures, similar optimum hydrogen pressure ranges exist.

The hydrogen is introduced into the reactor through line 14 containing valve 15 into compressor 16 which discharges through line 17 containing valve 18 and is commingled with hydrogen chloride and hydrocarbon in line 7 and the total mixture introduced into reaction zone 9. During the isomerization reaction, a small amount of the hydrocarbons react with the catalyst to form a complex commonly termed sludge. This sludge is periodically withdrawn from the reactor through line 28 containing valve 29.

The solid granular catalysts disposed within reactor 9 may comprise aluminum chloride, zinc chloride, zirconium chloride and iron chloride, either alone or in admixture with one another.

The temperature within reaction zone 9 is determined primarily by the extent of conversion desired and by the solubility of the catalyst in the hydrocarbons being charged. It is preferable that the temperature be sufficiently low to prevent any substantial carry-over of the catalyst in solution of the hydrocarbons leaving the reaction zone. A portion of the hydrocarbon leaving reaction zone 9 through line 10 is withdrawn through line 11 and is recovered as a product of the reaction. The hydrogen chloride and hydrogen may be removed in subsequent fractionating equipment and recycled to the reaction zone. The remaining portion of the isomerized product is withdrawn through line 10 and line 12 containing valve 13 and is commingled in line 4 with the fresh feed being introduced to the process.

The following examples are introduced to show the improved results obtained when operating in accordance with the present invention.

*Example I*

An acid treated gasoline fraction having a boiling range of 186 to 212° F. and an octane number of 55.5 is passed at room temperature through 500 cc. of granular aluminum chloride disposed in a reaction tube having a cross-sectional area of 10 square centimeters. Hydrogen chloride is added into the reaction zone in an amount equal to 15 weight per cent of the hydrocarbon charge. A portion of the reaction products emerging from the reaction zone is continually withdrawn and the remaining portion recycled to the fresh feed inlet. An amount of fresh feed equivalent to the amount of product withdrawn is continually introduced. The space velocity of the fresh feed measured as volumes of hydrocarbon per volume of catalyst bed per hour is about 0.1; the space velocity of the combined feed is 2. The free space in the reaction zone is about 300 cubic centimeters. The linear velocity of the combined feed is equivalent to 100 centimeters per hour giving a combined feed ratio of 20. The actual residence time of the fresh feed in the reaction zone is about 6 hours. The octane number of the isomerized product is 69.4, an improvement of 13.9 octane numbers over the original hydrocarbon charge. The loss due to gas formation is exceptionally low, amounting to only about 4% by weight of the charge.

*Example II*

The results of the following once-through operation under comparable conditions are indicative when compared with the results above of the improvement obtained when operating in accordance with the present invention. The fresh feed space velocity, temperature, hydrogen chloride concentration and residence time of the fresh feed are held as in Example I. The linear velocity because of the decreased volume of hydrocarbon reactants entering the reaction zone, is considerably less being about 5 centimeters per hour. The octane number of the resulting product is only about 67.1 and the loss due to gas formation is about 6.2 per cent.

It is obvious from a comparison of the above results that the isomerization of saturated hydrocarbons in the cyclic flow operation process has many advantages over the ordinary once-through operation.

*Example III*

A debutanized naphtha containing equal volumes of pentanes, hexanes and heptanes having an octane number of 63.2 is passed through the same reactor used in Example I under similar conditions of temperature and hydrogen chloride concentration with a residence time of 12 hours, combined feed space velocity of 1.8 and a linear velocity of 90 centimeters per hour. The rate of fresh feed addition is about 25 cubic centimeters per hour giving a combined feed ratio of about 36. The debutanized isomerate has a 9.9 Reid vapor pressure and a clear octane number of 80.3 motor method. The octant number is increased to 94.7 motor method by the addition of 4 cubic centimeters of ethyl fluid per gallon of isomerate.

*Example IV*

The effect of varying the space velocity of the combined feed while holding the other conditions of operation constant is shown in the following example.

A heptane fraction having a boiling range of 185–212° F. and an octane number of 53.4 is isomerized at room temperature with a hydrogen chloride concentration of 15 weight per cent of the charge. The fresh feed space velocity is 0.1 throughout the various tests. The depth in cross-sectional area of the catalyst bed, the combined feed ratio and the rate of fresh feed charge are adjusted to maintain a linear velocity of 100 centimeters per hour, and a residence time of 6 hours while varying the combined feed space velocity. The following results are obtained:

| Combined feed space velocity | Octane number of debutanized product motor method |
|---|---|
| 0.3 | 64.2 |
| 0.6 | 68.3 |
| 1.2 | 67.5 |
| 2.0 | 69.1 |

It is apparent from the above data that at combined feed ratios above 0.6 the octane number of the isomerized product is substantially constant. However, at a space velocity of 0.3 the octane number is considerably lower. I have determined that the critical minimum space velocity of the combined feed for optimum results is about 0.4.

*Example V*

The effect of varying hydrogen pressure while holding the other operation variables constant is shown in the following example:

The heptane fraction used in Example IV is isomerized in the same reaction zone used in Example I at room temperature with the hydrogen chloride concentration of 15 weight per cent of the charge. The operation conditions are a fresh feed space velocity of 0.05, a linear velocity of the combined feed of 45 centimeters per hour and a residence time of the reactants of 12 hours. The combined feed ratio is 18.

The following results are obtained by varying the hydrogen pressure:

| Hydrogen pressure, pounds per square inch | Octane number of debutanized product motor method |
|---|---|
| 0 | 68 |
| 50 | 71 |
| 100 | 71.3 |
| 200 | 65.1 |
| 400 | 58.6 |

From the above results it is apparent that under these particular conditions of operation the optimum range of hydrogen is about 25 to about 125 pounds per square inch.

The novelty and utility of the present invention are evident from the preceding specification and examples, although neither section is intended to unduly limit its generally broad scope.

I claim as my invention:

1. A process for the isomerization of a saturated hydorcarbon charging stock which comprises commingling with said charging stock a recycle stock formed as hereinafter set forth, passing the resultant combined feed at isomerizing temperature through a reaction zone containing a catalyst bed comprising a Friedel-Crafts metal halide isomerizing catalyst and therein effecting substantial isomerization of the charging stock, removing the resultant products from said zone and separating the same into portions of like composition, withdrawing one of said portions from the process, commingling another of said portions with the saturated hydrocarbon charging stock as said recycle stock, the amount of charging stock in the resultant combined feed being substantially equivalent to the amount of said portion of the products withdrawn from the process, and regulating the amount of said other portion of the products in the combined feed to provide in the reaction zone a linear velocity for the combined feed of at least 20 centimeters per hour, a residence time not in excess of about 15 hours and a space velocity not below about 0.4 measured as volumes of combined feed per volume of catalyst bed per hour.

2. A process for the isomerization of a saturated hydrocarbon charging stock which comprises commingling with said charging stock a recycle stock formed as hereinafter set forth, passing the resultant combined feed at isomerizing temperature through a reaction zone containing a catalyst bed comprising an aluminum halide and therein effecting substantial isomerization of the charging stock, removing the resultant products from said zone and separating the same into portions of like composition, withdrawing one of said portions from the process, commingling another of said portions with the saturated hydrocarbon charging stock as said recycle stock, the amount of charging stock in the resultant combined feed being substantially equivalent to the amount of said portion of the products withdrawn from the process, and regulating the amount of said other portion of the products in the combined feed to provide in the reaction zone a linear velocity for the combined feed of at least 20 centimeters per hour, a residence time not in excess of about 15 hours and a space velocity not below about 0.4 measured as volumes of combined feed per volume of catalyst bed per hour.

3. A process for the isomerization of a paraffinic charging stock which comprises commingling with said charging stock a recycle stock formed as hereinafter set forth, passing the resultant combined feed together with a hydrogen halide and at isomerizing temperature through a reaction zone containing a catalyst bed comprising an aluminum halide and therein effecting substantial isomerization of the charging stock, removing the resultant products from said zone and separating the same into portions of like composition, withdrawing one of said portions from the process, commingling another of said portions with the paraffinic charging stock as said recycle stock, the amount of charging stock in the resultant combined feed being substantially equivalent to the amount of said portion of the products withdrawn from the process, and regulating the amount of said other portion of the products in the combined feed to provide in the reaction zone a linear velocity for the combined feed of at least 20 centimeters per hour, a residence time not in excess of about 15 hours and a space velocity not below about 0.4 measured as volumes of combined feed per volume of catalyst bed per hour.

4. A process for the isomerization of a paraffinic charging stock which comprises commingling with said charging stock a recycle stock formed as hereinafter set forth, passing the resultant combined feed together with hydrogen chloride and at isomerizing temperature through a reaction zone containing a catalyst bed comprising aluminum chloride and therein effecting substantial isomerization of the charging stock, removing the resultant products from said zone and separating the same into portions of like composition, withdrawing one of said portions from the process, commingling another of said portions with the paraffinic charging stock as said recycle stock, the amount of charging stock in the resultant combined feed being substantially equivalent to the amount of said portion of the products withdrawn from the process, and regulating the amount of said other portion of the products in the combined feed to provide in the reaction zone a linear velocity for the combined feed of at least 20 centimeters per hour, a residence time not in excess of about 15 hours and a space velocity not below about 0.4 measured as volumes of combined feed per volume of catalyst bed per hour.

5. The process as defined in claim 1 further characterized in that said isomerization of the charging stock is effected in the presence of hydrogen.

6. The process as defined in claim 4 further characterized in that said isomerization of the charging stock is effected in the presence of hydrogen.

HERMAN S. BLOCH.